United States Patent [19]
Foisy et al.

[11] Patent Number: 6,061,206
[45] Date of Patent: May 9, 2000

[54] HEAD STACK ASSEMBLY FOR A DISK DRIVE HAVING A UNITARY MOLDED PLASTIC E-BLOCK

[75] Inventors: Gregory G. Foisy, Tracy; Nils Eric Larson, San Jose, both of Calif.; Sudha Narayan, Woodbridge, N.J.; Ajit Fathailal Sancheti, Redwood City; John Edwards, Mountain View, both of Calif.

[73] Assignee: Western Digital Corporation, Irvine, Calif.

[21] Appl. No.: 09/060,868

[22] Filed: Apr. 15, 1998

[51] Int. Cl.⁷ .............................. G11B 5/55; G11B 21/12
[52] U.S. Cl. ............................................ 360/105; 360/106
[58] Field of Search ..................................... 360/104, 105, 360/106, 107, 109

[56] References Cited

U.S. PATENT DOCUMENTS

| | | | |
|---|---|---|---|
| 4,233,477 | 11/1980 | Rice et al. ........................... | 179/110 A |
| 4,549,157 | 10/1985 | Loubier .................................. | 335/303 |
| 4,855,853 | 8/1989 | Matsushita et al. ..................... | 360/106 |
| 5,051,855 | 9/1991 | Ghose et al. ............................ | 360/106 |
| 5,122,703 | 6/1992 | Takahashi et al. ....................... | 310/36 |
| 5,165,090 | 11/1992 | Takahashi et al. ...................... | 369/215 |
| 5,305,169 | 4/1994 | Anderson et al. ...................... | 360/105 |
| 5,382,851 | 1/1995 | Loubier ................................... | 310/13 |
| 5,497,282 | 3/1996 | Hoffmann et al. ...................... | 360/104 |
| 5,528,091 | 6/1996 | Loubier et al. .......................... | 310/13 |
| 5,621,590 | 4/1997 | Pace et al. .............................. | 360/106 |
| 5,677,815 | 10/1997 | Chan ....................................... | 360/106 |
| 5,734,528 | 3/1998 | Jabbari et al. .......................... | 360/106 |
| 5,818,667 | 10/1998 | Larson ................................... | 360/106 |

Primary Examiner—David L. Ometz
Attorney, Agent, or Firm—Milad G. Shara

[57] ABSTRACT

A head stack assembly for mounting to a pivot bearing cartridge in a disk drive includes a coil having opposite electrical ends and a unitary molded plastic E-block fabricated from a first thermoplastic material containing electrically conductive filler material such that the E-block is electrically conductive. The E-block defines a generally cylindrically shaped body portion and a plurality of elongated arms, the body portion having a pivot bore for receiving the pivot bearing cartridge, a plurality of spaced-apart arm-support regions, and a surface defining a mounting site. Each arm is cantilevered from a respective one of the arm-support regions to project radially away from the pivot bore. The head stack assembly further includes an overmolded coil frame securing the coil to the body portion such that the coil is cantilevered to project radially away from the pivot bore. The overmolded coil frame is fabricated from a second thermoplastic material and is electrically non-conductive. The head stack assembly further includes a flex circuit cable having a portion secured at the mounting site, the flex circuit cable including a plurality of conductors, an electrical path from a first one of the conductors to provide ground potential to the E-block, and a pair of electrical paths from a second and a third of the conductors to the opposite electrical ends of the coil.

4 Claims, 11 Drawing Sheets

HEAD STACK ASSEMBLY FOR A DISK DRIVE HAVING A UNITARY MOLDED PLASTIC E-BLOCK

BACKGROUND OF THE INVENTION

1. Field of the Invention

This invention relates to disk drives. More particularly, this invention relates to a head stack assembly having a unitary molded plastic E-block and a hard disk drive including the head stack assembly.

2. Description of the Prior Art and Related Information

A huge market exists for disk drives, e.g., hard disk drives, for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 1 gigabyte per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main subassemblies of a hard disk drive are a head disk assembly and a printed circuit board assembly. The printed circuit board assembly includes circuitry for processing signals and controlling operations of the drive.

The head disk assembly includes an enclosure including a base and a cover, at least one disk having at least one recording surface, a spindle motor for causing each disk to rotate, and an actuator arrangement. Actuator arrangements can be characterized as either linear actuators or rotary actuators; substantially all contemporary, cost-competitive small form factor drives employ a rotary actuator.

Typically, a rotary actuator arrangement includes a permanent magnet arrangement, a head stack assembly, and a pivot bearing cartridge for rotating the head stack assembly. The head stack assembly includes a coil frame including a coil, a body portion which surrounds the pivot bearing cartridge, a plurality of actuator arms ("arms") attached to the body portion, and a head gimbal assembly attached to each arm. The head gimbal assembly includes a load beam, a gimbal attached to the load beam, and a head supported by the gimbal. The head is positioned over a track on a recording surface of a disk to read or write data from or on the track.

Typically, the body portion and the arms of the head stack assembly are made out of metal and forms a unitary structure known as an "E-block." A plastic coil frame may be overmolded around the E-block. The E-block typically includes three arms but also may include other number of arms such as two, four, five and six arms. Such an E-block may be made by a combination of processes such as cast and machining processes which tend to be costly. In addition, such an E-block has a relatively high mass since the entire unitary structure is made out of metal. The relatively high mass results in a corresponding high moment of inertia about the pivot axis of the head stack assembly. Such a high moment of inertia results in relatively high access times for the disk drive for a given amount of power applied to the coil.

Figure 10A:
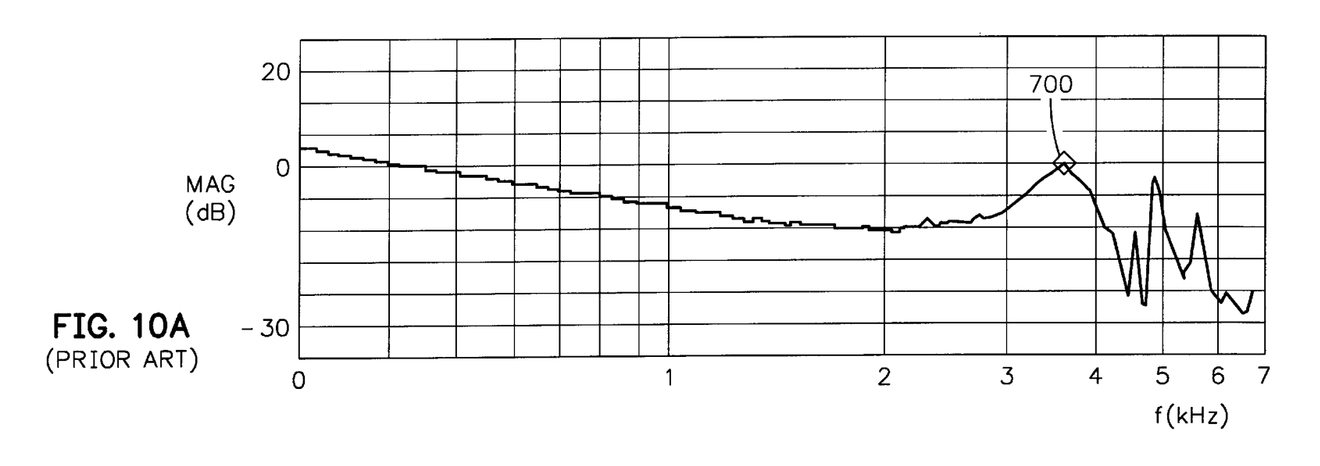
FIG. 10A is a graph of relative head displacement (Mag) as a function of frequency of a Prior Art head stack assembly having an all metal E-block which shows the effects of resonance at various resonant frequencies.
Figure 10B:
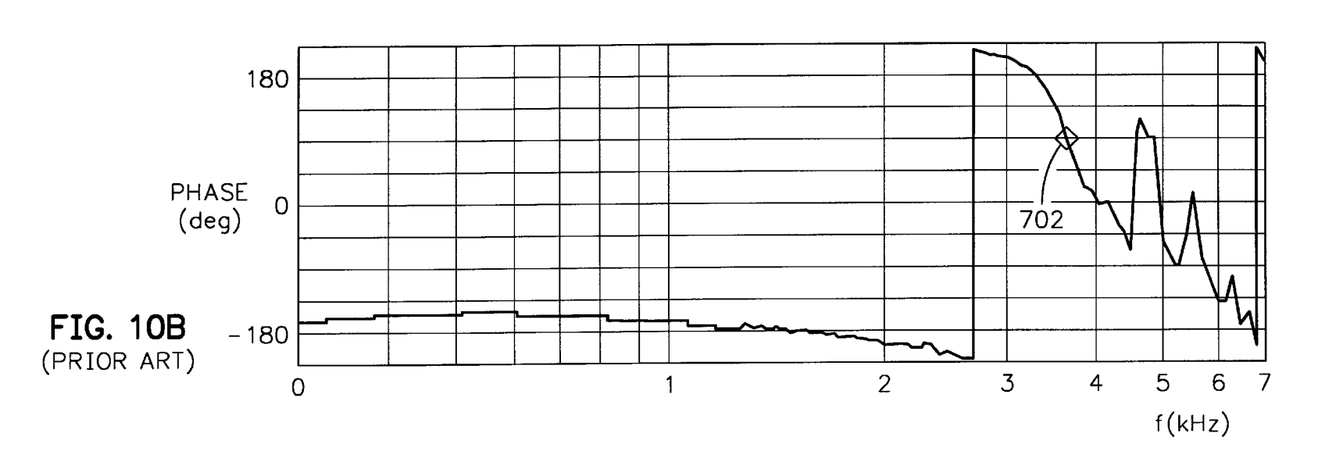
FIG. 10B is a graph of phase change as a function of frequency of the Prior Art head stack assembly which shows the effects of resonance at various resonant frequencies.

The high access times are also dependent on vibrations induced in the head stack assembly. These vibrations can include frequency components at or near resonant frequencies of the head stack assembly, resulting in relatively high amplitude vibrations. Such vibrations can degrade the performance of the disk drive, especially if the vibrations occur at frequency components substantially below a servo sampling rate of the disk drive. For example, FIGS. 10A–10B are graphs which show the effects of resonance for a Prior Art magnesium E-block in a disk drive having a servo sampling rate of 4.3 kilohertz (kHz). As shown, a dominating peak 700 occurs at about 3.6 kHz which may adversely affect the servo system of the disk drive since peak 700 may reduce the gain and phase margin of the servo system.

In efforts to reduce the mass of the E-block, some head stack assemblies employ a "hybrid" structure which includes a plastic overmolded structure encapsulating a plurality of stamped individual metal arms. The plastic overmolded structure includes a plastic overmolded body portion and a plastic overmolded coil frame. However, such hybrid structures are also costly to make since, inter alia, the arms are formed by a stamping process.

As mentioned above, vibrations can occur at frequency components at or near resonant frequencies of the head stack assembly. One such resonant frequency ("overmold interface resonant frequency") is defined by an interface between the plastic overmolded coil frame and the all metal E-block or between the plastic overmolded body portion and the stamped metal arms. In each instance, the plastic suitably includes a thermoplastic material such as PPS having glass filler material. When plastic is overmolded around an all metal E-block or stamped metal arms, the overmolded plastic clamps around cleated portions of the all metal E-block or stamped metal arms. While the plastic is adequately attached to the metal parts such as the all metal E-block or stamped metal arms, it is difficult to accurately control the location of the overmold interface resonant frequency such that it falls on or near the servo sampling rate. Such difficulty arises since the location of the overmold interface resonant frequency is determined by numerous variables such as surface finish of the metal parts, mold temperature and pressure, glass filler material content and quality, and moisture content of the thermoplastic material.

SUMMARY OF THE INVENTION

This invention can be regarded as a head stack assembly for mounting to a pivot bearing cartridge in a disk drive. The head stack assembly includes a coil having opposite electrical ends and a unitary molded plastic E-block fabricated from a first thermoplastic material containing electrically conductive filler material such that the E-block is electrically conductive. The E-block defines a generally cylindrically shaped body portion and a plurality of elongated arms, the body portion having a pivot bore for receiving the pivot bearing cartridge, a plurality of spaced-apart arm-support regions, and a surface defining a mounting site. Each arm is cantilevered from a respective one of the arm-support regions to project radially away from the pivot bore.

The head stack assembly further includes an overmolded coil frame securing the coil to the body portion such that the coil is cantilevered to project radially away from the pivot bore. The overmolded coil frame is fabricated from a second thermoplastic material and is electrically non-conductive. The head stack assembly further includes a flex circuit cable having a portion secured at the mounting site, the flex circuit cable including a plurality of conductors, means defining an electrical path from a first one of the conductors to provide ground potential to the E-block, and means defining a pair of electrical paths from a second and a third of the conductors to the opposite electrical ends of the coil.

This invention can also be regarded as a head stack assembly for mounting to a pivot bearing cartridge in a disk drive. The head stack assembly includes a coil having opposite electrical ends and a unitary molded plastic E-block fabricated from a first thermoplastic material containing electrically conductive filler material such that the E-block is electrically conductive. The E-block defines a generally cylindrically shaped body portion and a plurality of elongated arms, the body portion having a pivot bore for receiving the pivot bearing cartridge, a plurality of spaced-apart arm-support regions, and a surface defining a mounting site. Each arm is cantilevered from a respective one of the arm-support regions to project radially away from the pivot bore and each arm defines a respective longitudinal axis. The respective longitudinal axes define a common vertical plane. Each arm includes a first elongated arm portion and a second elongated arm portion. Each respective longitudinal axis divides each first and second elongated arm portions. The first elongated arm portions constitute a first mass of the arms and the second elongated arm portions constitute a second mass of the arms. The second mass is within a predetermined percentage of the first mass such that the arms are symmetrical about the common vertical plane.

The head stack assembly further includes an overmolded coil frame securing the coil to the body portion such that the coil is cantilevered to project radially away from the pivot bore. The overmolded coil frame is fabricated from a second thermoplastic material and is electrically non-conductive. The head stack assembly further includes a flex circuit cable having a portion secured at the mounting site, the flex circuit cable including a plurality of conductors, means defining an electrical path from a first one of the conductors to provide ground potential to the E-block and means defining a pair of electrical paths from a second and a third of the conductors to the opposite electrical ends of the coil.

This invention can also be regarded as a head stack assembly for mounting to a pivot bearing cartridge in a disk drive. The head stack assembly includes a coil having opposite electrical ends and a unitary molded plastic E-block fabricated from a first thermoplastic material containing electrically conductive filler material such that the E-block is electrically conductive. The E-block defines a generally cylindrically shaped body portion and a plurality of elongated arms, the body portion having a pivot bore for receiving the pivot bearing cartridge, a plurality of spaced-apart arm-support regions, and a surface defining a mounting site. Each arm is cantilevered from a respective one of the arm-support regions to project radially away from the pivot bore.

The head stack assembly further includes an overmolded coil frame securing the coil to the body portion such that the coil is cantilevered to project radially away from the pivot bore. The overmolded coil frame is fabricated from a second thermoplastic material and is electrically non-conductive. The head stack assembly further includes a flex circuit cable having a portion secured at the mounting site, the flex circuit cable including a plurality of conductors, means defining an electrical path from a first one of the conductors to provide ground potential to the E-block, and means defining a pair of electrical paths from a second and a third of the conductors to the opposite electrical ends of the coil wherein the first thermoplastic material is substantially the same thermoplastic material as the second thermoplastic material.

This invention can also be regarded as a disk drive including a base, a spindle motor attached to the base, a disk mounted on the spindle motor, a pivot bearing cartridge mounted to the base, and a head stack assembly. The head stack assembly includes a coil having opposite electrical ends and a unitary molded plastic E-block fabricated from a first thermoplastic material containing electrically conductive filler material such that the E-block is electrically conductive. The E-block defines a generally cylindrically shaped body portion and a plurality of elongated arms, the body portion having a pivot bore for receiving the pivot bearing cartridge, a plurality of spaced-apart arm-support regions, and a surface defining a mounting site. Each arm is cantilevered from a respective one of the arm-support regions to project radially away from the pivot bore.

The head stack assembly further includes an overmolded coil frame securing the coil to the body portion such that the coil is cantilevered to project radially away from the pivot bore. The overmolded coil frame is fabricated from a second thermoplastic material and is electrically non-conductive. The head stack assembly further includes a flex circuit cable having a portion secured at the mounting site, the flex circuit cable including a plurality of conductors, means defining an electrical path from a first one of the conductors to provide ground potential to the E-block, and means defining a pair of electrical paths from a second and a third of the conductors to the opposite electrical ends of the coil.

This invention can also be regarded as a disk drive including a base, a spindle motor attached to the base, a disk mounted on the spindle motor, a pivot bearing cartridge mounted to the base, and a head stack assembly. The head stack assembly includes a coil having opposite electrical ends and a unitary molded plastic E-block fabricated from a first thermoplastic material containing electrically conductive filler material such that the E-block is electrically conductive. The E-block defines a generally cylindrically shaped body portion and a plurality of elongated arms, the body portion having a pivot bore for receiving the pivot bearing cartridge, a plurality of spaced-apart arm-support regions, and a surface defining a mounting site. Each arm is cantilevered from a respective one of the arm-support regions to project radially away from the pivot bore and each arm defines a respective longitudinal axis. The respective longitudinal axes define a common vertical plane. Each arm includes a first elongated arm portion and a second elongated arm portion. Each respective longitudinal axis divides each first and second elongated arm portions. The first elongated arm portions constitute a first mass of the arms and the second elongated arm portions constitute a second mass of the arms. The second mass is within a predetermined percentage of the first mass such that the arms are symmetrical about the common vertical plane.

The head stack assembly further includes an overmolded coil frame securing the coil to the body portion such that the coil is cantilevered to project radially away from the pivot bore. The overmolded coil frame is fabricated from a second thermoplastic material and is electrically non-conductive. The head stack assembly further includes a flex circuit cable having a portion secured at the mounting site, the flex circuit cable including a plurality of conductors, means defining an electrical path from a first one of the conductors to provide ground potential to the E-block and means defining a pair of electrical paths from a second and a third of the conductors to the opposite electrical ends of the coil.

Preferably, the first and second thermoplastic materials are the same thermoplastic material which includes polyphenylene sulfide, polyphthalamide or liquid crystal polymer. Preferably, the conductive filler material is carbon and the second thermoplastic material includes glass filler material.

DETAILED DESCRIPTION OF PREFERRED EMBODIMENTS

Figure 1:
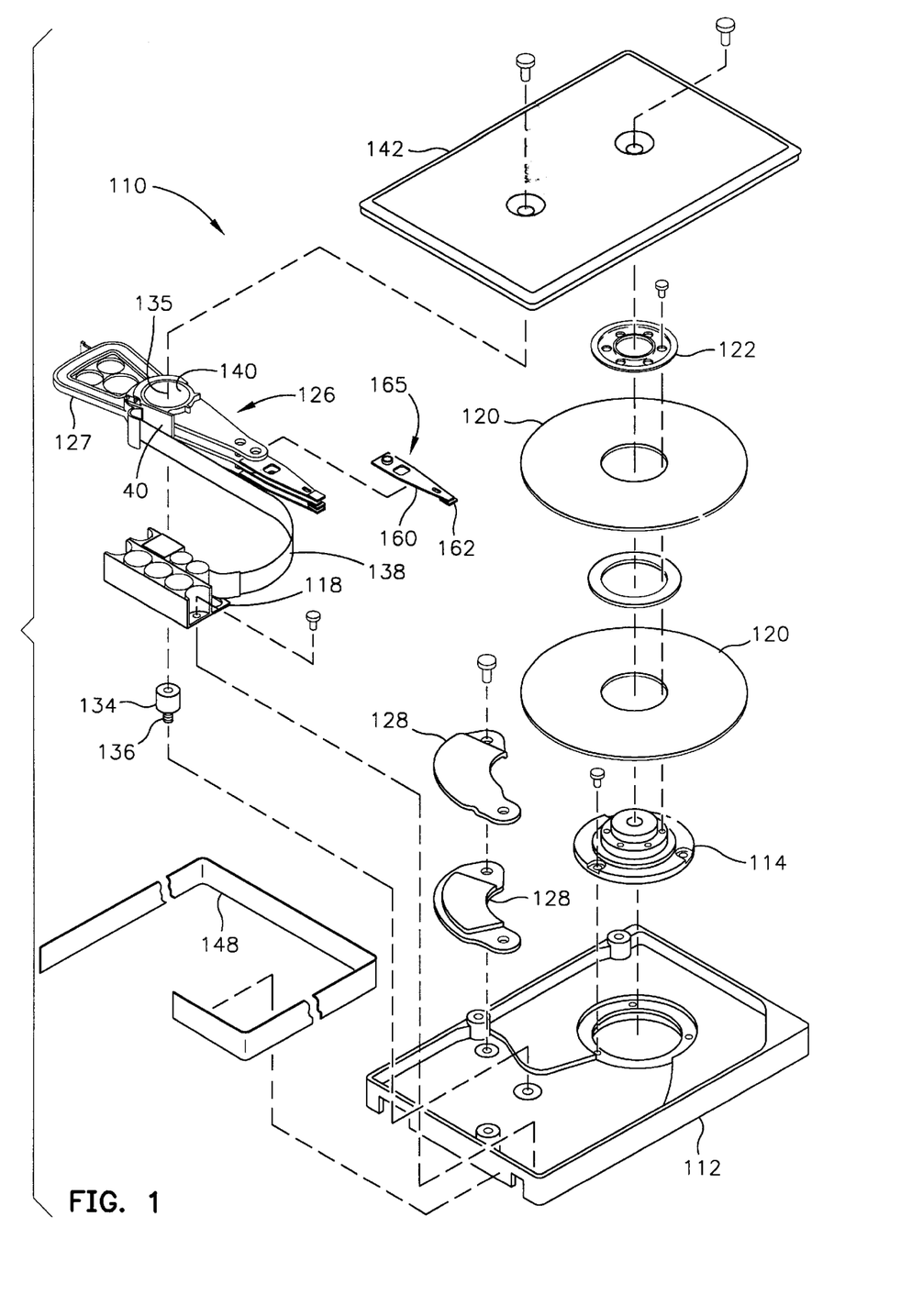
FIG. 1 is an exploded perspective view of a hard disk drive which includes an embodiment of this invention.
Figure 2A:
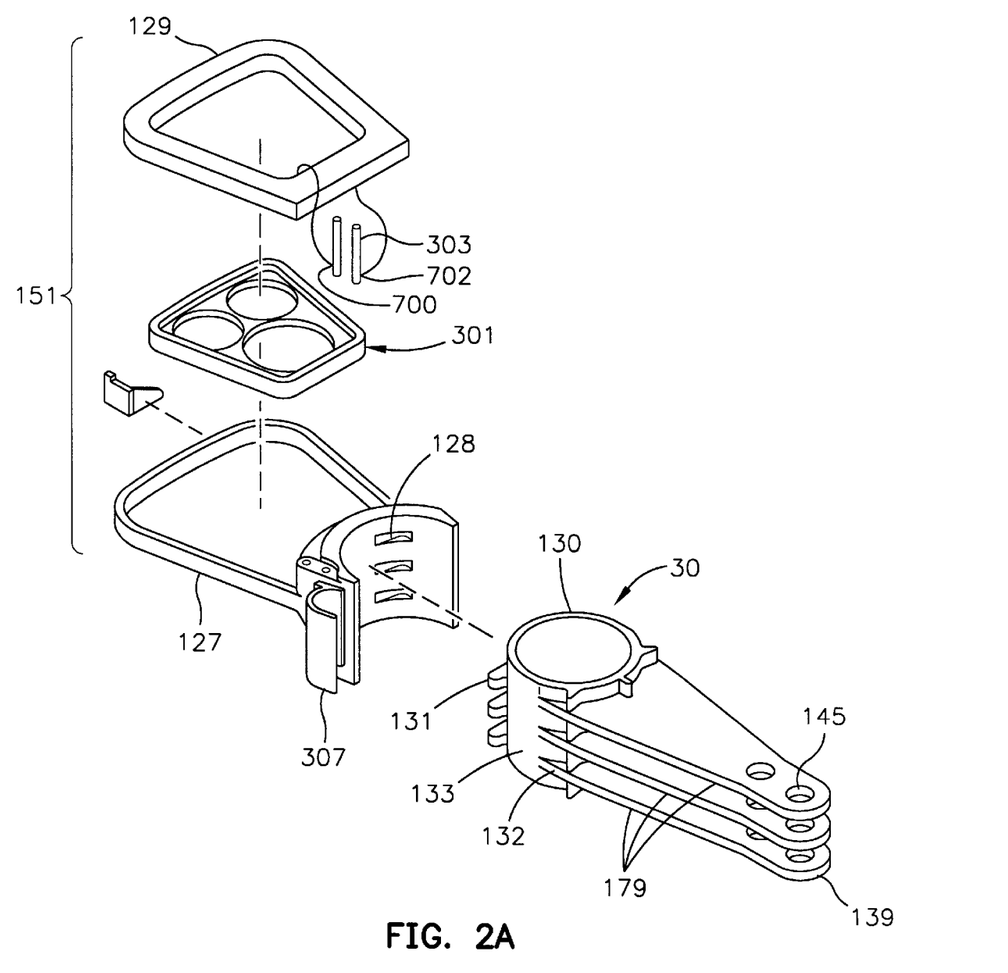
FIG. 2A is an exploded perspective view of a portion of the head stack assembly shown in FIG. 1.

With reference to FIGS. 1 and 2A, a preferred embodiment of a head stack assembly 126 according to this invention is shown within a hard disk drive 110. Disk drive 110 includes a base 112 and a cover 142 which together form an enclosure. Suitably, a tape seal 148 is used to seal the enclosure. Disk drive 110 further includes a spindle motor 114 mounted to base 112, a plurality of disks 120 mounted on spindle motor 114, and a disk clamp 122 for clamping the disks. Each disk includes a plurality of recording surfaces for recording or reading data on or from the disk. Disk drive 110 includes a rotary actuator arrangement which includes head stack assembly 126, a pivot bearing cartridge 134 having a shaft 136 for attachment to base 112, and a permanent magnet arrangement which includes upper and lower plates 128. Suitably, one of the plates includes a permanent magnet.

Head stack assembly 126 includes an overmolded coil frame 127, a molded plastic E-block 30, a plurality of head gimbal assemblies 165, a flex circuit cable 138, a flex circuit cable guide 307 and a flex circuit cable pin (not shown) for securing a portion of flex circuit cable 138 to guide 307. Head stack assembly further includes a pivot bore 140 which defines a pivot axis 135 for the head stack assembly. Flex circuit cable 138 includes a mounting portion 40 secured at a mounting site 133. Suitably, mounting portion is secured to the mounting site using an adhesive. Portion 40 suitably includes a plurality of components (not shown) such as a preamplifier IC chip and a number of discrete components. Flex circuit cable 138 includes a grounding portion 118 which includes a metal ground contact secured to base 112 via a screw (not shown). Grounding portion 118 grounds the arms of the head stack assembly to the base which is suitably a metal base. Each head gimbal assembly 165 includes a load beam 160 and a head 162 attached to a distal end of load beam 160 via a gimbal (not shown). Head 162 can include an inductive head which is used to both read and write data on a recording surface of disk 120 or a magnetoresistance (MR) head which includes an MR element to read data and an inductive element to write data.

With reference to FIG. 2A, a subassembly 151 of head stack assembly 126 is shown which includes plastic E-block 30 and coil frame 127. Plastic E-block 30 includes ("defines") a generally cylindrically shaped body portion 130, a plurality of elongated arms 179, a surface for defining mounting site 133, a plurality of cleats 131, and a plurality of spaced-apart arm-support regions 132. While the preferred embodiment includes three arms 179 and three corresponding arm-support regions 132 spaced-apart in a direction parallel with pivot axis 135 (FIG. 1), plastic E-block 30 may include different number of arms such as two, four, five and six arms; the number of arms are dependent on the number of disks used in a disk drive. Each arm is cantilevered from a respective one of arm-support regions 132 to project radially away from pivot bore 140 (FIG. 1). Each arm includes a distal end 139 having a swage hole 145.

While a circular swage hole is shown in FIG. 2A, a non-circular swage hole is preferred when a swaging operation is used to attach a head gimbal assembly to the distal end of each arm. The non-circular swage hole embodiments will be more fully described below with reference to FIGS. 5 and 7A–7D.

In the preferred embodiment, plastic E-block 30 is a unitary molded plastic E-block such as the E-block shown in FIG. 2A and is formed by an injection molding process (to be described below). Plastic E-block 30 is fabricated from a first thermoplastic material containing electrically conductive filler material such that the E-block is electrically conductive. In the preferred embodiment, the first thermoplastic material is either polyphenylene sulfide (PPS), polyphthalamide (PPA), or liquid crystal polymer (LCP), and the conductive filler material is carbon. Preferably, the carbon constitutes about 15 to about 60 percent of the mass of the plastic E-block. As the percentage increases, the stiffness and the conductivity of the plastic E-block increase.

Continuing with FIG. 2A, coil frame 127 having a bobbin 301 and a coil 129 with opposite electrical ends 700 and 702 are shown. Coil frame 12 secures coil 129 to body portion 130 such that the coil is cantilevered to project radially away from pivot bore 140 (FIG. 1). Coil frame further includes a plurality of recesses 128 which interlock with corresponding cleats 131. Coil frame 127 is fabricated from a second thermoplastic material and is electrically non-conductive. Preferably, the second thermoplastic material is either PPS, PPA or LCP and includes glass filler material which makes coil frame 127 electrically non-conductive. Preferably, the glass filler material constitutes about 20 to about 50 percent of the mass of the coil frame; within the preferred range, the percentage of the glass filler material is 33 to 40 percent. In the preferred embodiment, the first thermoplastic material of plastic E-block 30 and the second thermoplastic material of coil frame 127 are the same thermoplastic material. For example, PPS may be used to fabricate both plastic E-block 30 and coil frame 127. The use of the same thermoplastic material or substantially the same thermoplastic material offers significant advantages which will be described below relative to FIG. 4. The phrase "substantially the same thermoplastic material" includes thermoplastic materials with similar melt, flow and bond characteristics. Such materials form a bond between mating surfaces through the melted interface between the two materials either by chemical bonds or "knitting" of molecules. For example, PPA may bond to some forms of Nylon during molding since they are from a similar molecular family. The Nylon mating surface "wets" or "melts" when contacted by the hot PPA which results in chemical bonding.

Figure 2B:
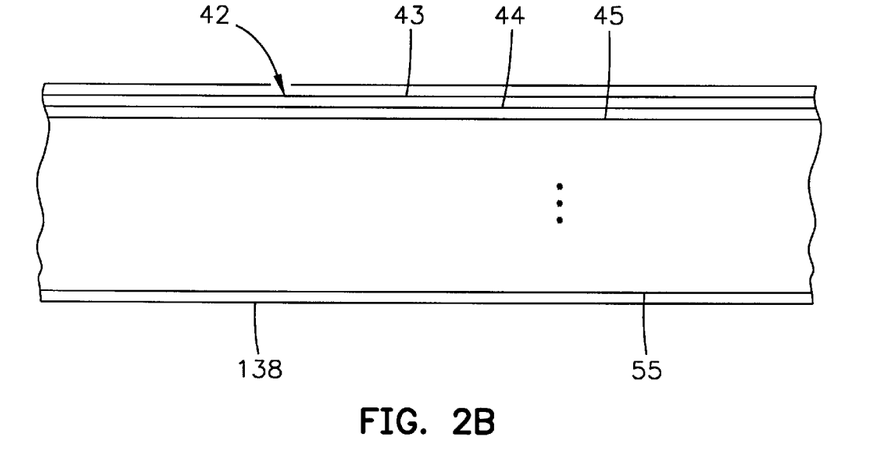
FIG. 2B is plan view of a portion of the flex circuit cable shown in FIG. 11 the portion includes a plurality of conductors.

With reference to FIG. 2B, a portion of flex circuit cable 138 is shown which includes a plurality of conductors generally denoted by 42. Conductors 43, 44, 45 . . . 55 are used, inter alia, to transmit signals from the heads to the electrical components on the mounting portion of the flex circuit cable. Head stack assembly 126 (FIG. 1) further includes means defining an electrical path ("electrical path defining means") from a first one of the conductors, such as conductor 45, to provide ground potential to plastic E-block 30 (FIG. 2A). The electrical path defining means includes structure such as the metal ground contact on grounding portion 118 (FIG. 1) and a protrusion 119 (FIG. 5) on one of the arms which is connected to one of the ends of conductor 45 via a solder connection. The solder connection also functions to secure the mounting portion to the mounting site. The metal ground contact is connected to the other end of conductor 45 which provides sufficient grounding for plastic E-block 30. Head stack assembly 126 further includes means defining a pair of electrical paths ("electrical path pair defining means") from a second and a third conductor, such as conductors 44 and 43 respectively, to opposite electrical ends 700 and 702 (FIG. 2A) of coil 129. The electrical path pair defining means includes structure such as metal pins 303 (FIG. 2A) which connect opposite electrical ends 700 and 702 to conductors 44 and 43, respectively via solder connections. Such solder connections also secure the mounting portion to the mounting site.

Figure 3:
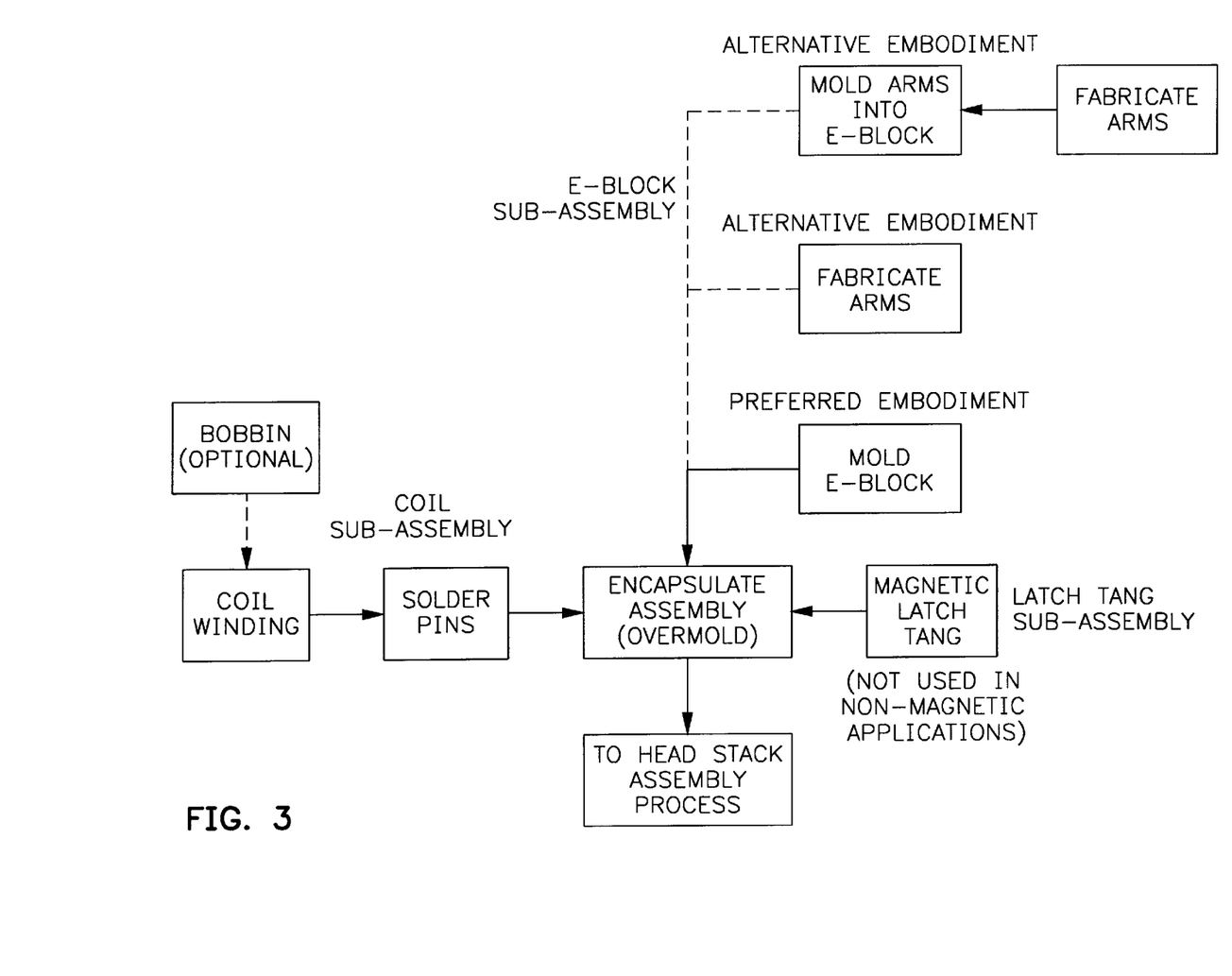
FIG. 3 is a flow diagram of alternative methods of making a head stack assembly of this invention.

With reference to FIG. 3, alternative methods of making the subassembly 151 shown in FIG. 2A are shown. Preferably, plastic E-block 30 ("E-block sub-assembly") is formed first in various alternative embodiments. The preferred embodiment is to mold the plastic E-block to form a unitary molded plastic E-block. A suitable mold cavity is injected with the first thermoplastic material such as PPS which contains carbon filler material at a suitable pressure and temperature. In an alternative embodiment, the arms such as arms 179 shown in FIG. 2A may be initially formed by a molding process and then the arms would be placed in a suitable mold cavity to overmold a body portion such as body portion 130 (FIG. 2A) over the arms. In yet another alternative embodiment, each arm is molded and stacked upon one another to form a plastic E-block. Suitably, the stacked plastic arms may be fused together via ultrasonic welding or thermal staking or via mechanical fasteners or adhesives.

After the plastic E-block is formed, the plastic E-block and a coil subassembly which includes a coil winding such as coil 129, solder pins such as metal pins 303, and a magnetic latch tang are placed in a suitable mold cavity and the second thermoplastic material containing glass filler material is injected into the mold cavity at a suitable temperature and pressure to overmold a coil frame such as coil frame 129. Then, the halves of the mold cavity ("mold") are pulled apart and a molded subassembly such as subassembly 151 is taken out of the mold. Other components such as a flex circuit cable and head gimbal assemblies are suitably attached to the molded subassembly in subsequent processes. A bobbin is shown as optional since the bobbin such as bobbin 301 would be simultaneously formed with the coil frame once the thermoplastic material is injected into the mold cavity. Alternatively, the bobbin may be a separate plastic piece which is placed in the mold cavity.

Figure 4:
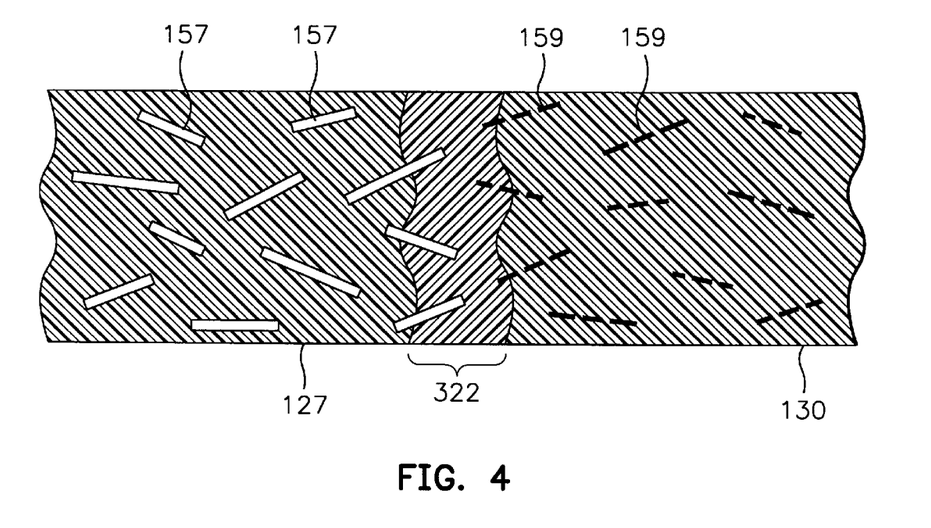
FIG. 4 is a greatly enlarged cross section view of a portion of the structure shown in FIG. 2A in which portions of the overmolded coil frame, the E-block body portion and the interface between the coil frame and the body portion are shown.

With reference to FIG. 4, portions of body portion 130, overmolded coil frame 127 and a bond region 322 are shown after fabrication. As shown, carbon filler material 159 and glass filler material 157 overlap into bond region 322. When the coil frame is overmolded over the plastic E-block during the injection molding process, bond region 322 forms at a interface between the plastic E-block and the coil frame such that the two components are joined together via molecular bonding. In a preferred embodiment, the thermoplastic material used to fabricate the plastic E-block and the thermoplastic material used to fabricate the coil frame are the same material. Preferably, the same material may be PPS, LCP, or PPA. Significantly, when the same or substantially the same material is used, an effective molecular bond occurs between the plastic E-block and the coil frame generally represented by bond region 322. Such an effective molecular bond is formed when the thermoplastic material of the coil frame comes in contact with the same thermoplastic material of the plastic E-block and the two materials resolidify together as the mold cools. The molecular bond results in a significantly improved assembly joint between the plastic E-block and the overmolded coil frame versus the prior art all metal E-block or stamped metal arms and overmolded coil frame. Significantly, such an improved assembly joint results in extremely consistent resonance characteristics due to the elimination of many of the variables listed above.

Figure 5:
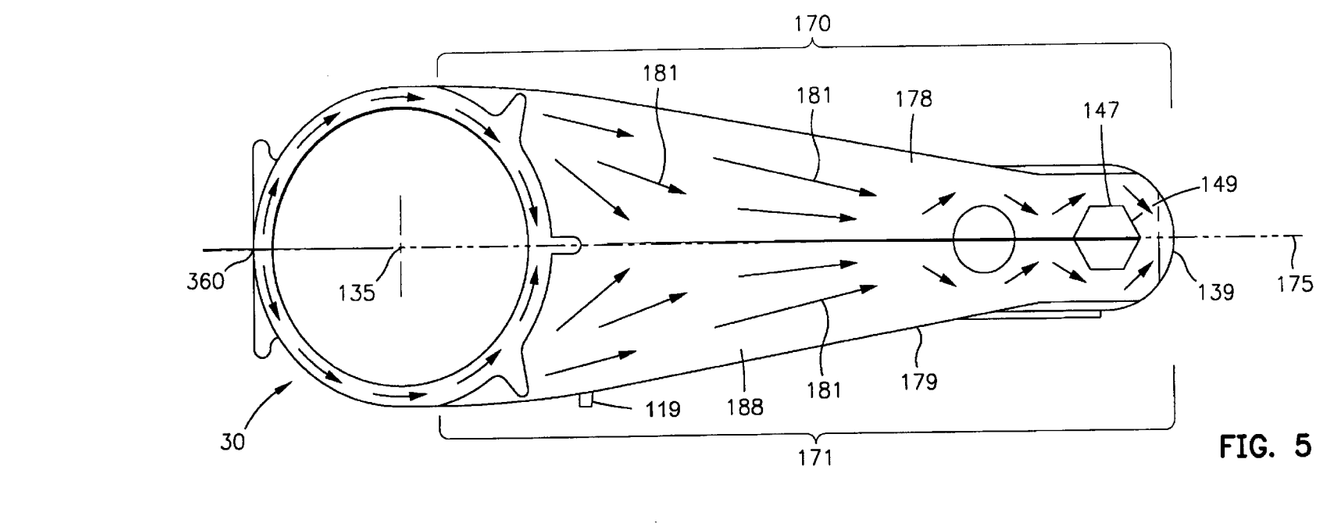
FIG. 5 is a plan view of the E-block shown in FIG. 2A which schematically represents the flow of thermoplastic material during an injection molding process and an embodiment of a swage hole.

With reference to FIG. 5, a plan view of plastic E-block 30 is shown in which the flow of the first thermoplastic material during an injection molding process is schematically depicted as 181. Such thermoplastic material flow is also schematically depicted in FIGS. 6 and 7A–7D as 181. Continuing with FIG. 5, each arm 179 such as the shown top arm defines a longitudinal axis 175 which coincides with a nit line formed by the molding process. The nit line (i.e., longitudinal axis 175) is defined by where the two halves of a mold are joined together. Each arm further includes distal end 139 having a predefined curvature and including a hexagonal swage hole 147. As mentioned previously with reference to FIG. 2A, a non-circular swage hole such as hexagonal swage hole 147 is preferred when a head gimbal assembly is attached to distal end 139 using a swaging operation. A swaging operation typically includes forcing a metal ball through a swage hole such that a cylindrical member of a load beam is forced apart in the swage hole thereby attaching the load beam to the arm. Typically, the stresses developed by the swaging operation near a circular swage hole do not present a significant problem for metal arms because of their relatively high stiffness. However, when arms having a lower stiffness, such as plastic arms, are used, the swaging operation may break the arms because of the high stresses developed on the nit line. As a result, hexagonal swage hole 147 is preferably employed when a swaging operation is used to attach a head gimbal assembly to an arm. Such a swage hole reduces the stresses developed on the nit line by concentrating the stress at a midpoint 149 of each segment of the hexagonal swage hole.

Continuing with FIG. 5, the top arm also includes protrusion 119 for connecting to a conductor in the flex circuit cable to provide ground potential to the plastic E-block. The point where the thermoplastic material would enter the mold cavity is generally represented by 360. Since each arm defines a respective longitudinal axis, such as longitudinal axis 175, the longitudinal axes define a common vertical plane (not shown). Each arm includes a first elongated arm portion 178 having a length generally represented by 170 and a second elongated arm portion 188 having a length generally represented by 171 such that each longitudinal axis 175 divides each respective elongated arm portions.

As shown in FIG. 5, plastic E-block 30 is symmetrical about longitudinal axis 175 such that one half of the plastic E-block is substantially a mirror image of the other half. The mass of the first elongated arm portions constitute a first mass of the arms and the mass of the second elongated arm portions constitute a second mass of the arms. The second mass is within a predetermined percentage of the first mass such that the arms are symmetrical about the common vertical plane. Preferably, the second mass is within about plus or minus five percent of the first mass.

Figure 6:
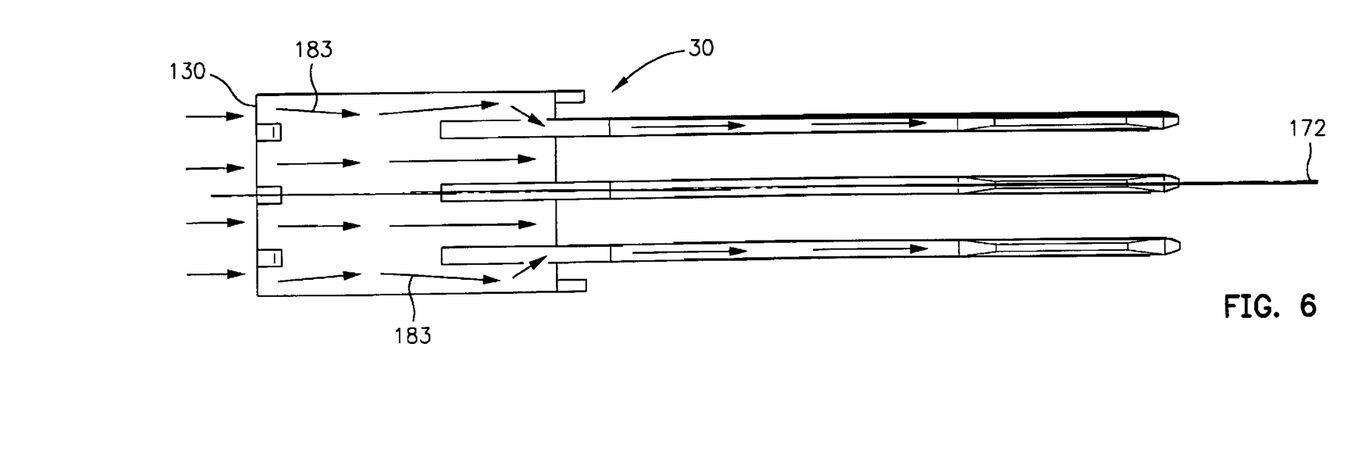
FIG. 6 is a side view of FIG. 5 which schematically represents the flow of thermoplastic material during an injection molding process.

With reference to FIG. 6, plastic E-block 30 is symmetrical about an axis 172 defined by the middle arm. As a result, the top half of the plastic E-block above axis 171 is substantially a mirror image of the bottom half of the plastic E-block below axis 171.

Figure 7A:
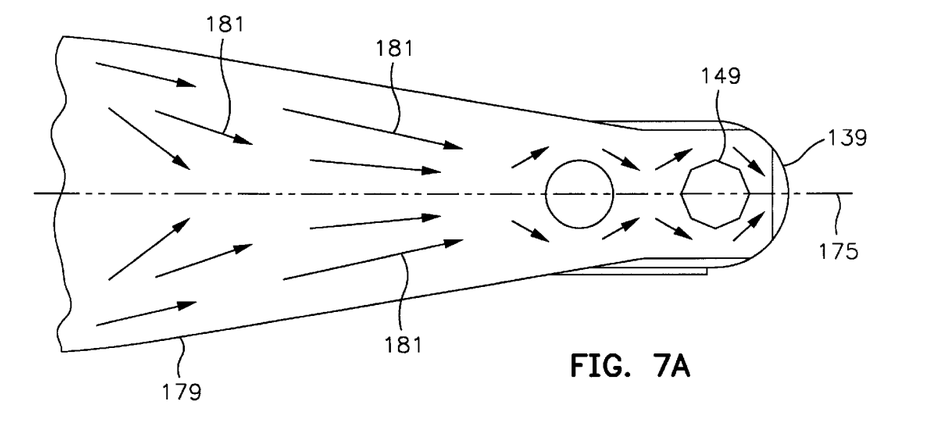
FIG. 7A is a plan view of a portion of FIG. 5 which shows another embodiment of a swage hole in an actuator arm.
Figure 7B:
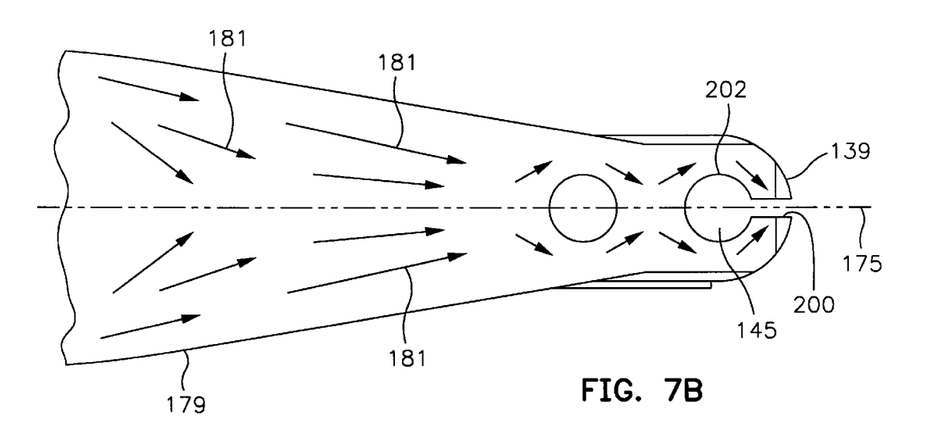
FIG. 7B is a plan view of a portion of FIG. 5 which shows another embodiment of a swage hole in an actuator arm.
Figure 7C:
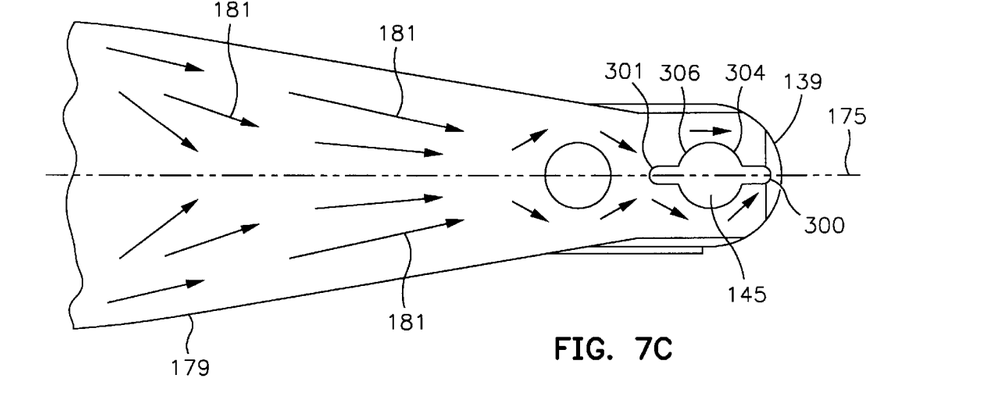
FIG. 7C is a plan view of a portion of FIG. 5 which shows another embodiment of a swage hole in an actuator arm.
Figure 7D:
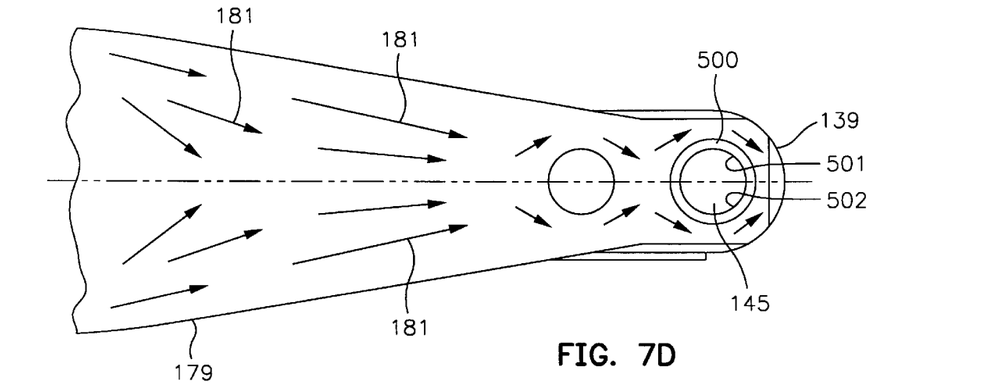
FIG. 7D is a plan view of a portion of FIG. 5 which shows another embodiment of a swage hole in an actuator arm.

With reference to FIGS. 7A–7D, alternative embodiments of swage holes are shown in which a swaging operation may be used to attach a head gimbal assembly to an arm. In FIG. 7A, an octagonal swage hole 149 is shown which reduces the stress on nit line 175 in substantially the same way as the hexagonal swage hole shown in FIG. 5. In FIG. 7B, an open end slit swage hole 202 includes surface 200. When a metal ball is forced through opening 145, surface 200 flexes (which direction ???) to reduce the stress on nit line 175. In FIG. 7C, a dual slit swage hole 304 includes dual slits 300 and 301. During a swaging operation, the stress is distributed along the slits such that the stress is reduced at nit line 175. In FIG. 7D, a metal ring 500 includes an inner cylindrical surface 502. Ring 500 reduces the stress on the nit line since the metal ball does not contact the plastic arm when the ball is forced through opening 145. Suitably, ring 500 is made from metal such as aluminum, magnesium, or steel and the ring is molded in place during the injection molding of the plastic E-block.

Figure 8A:
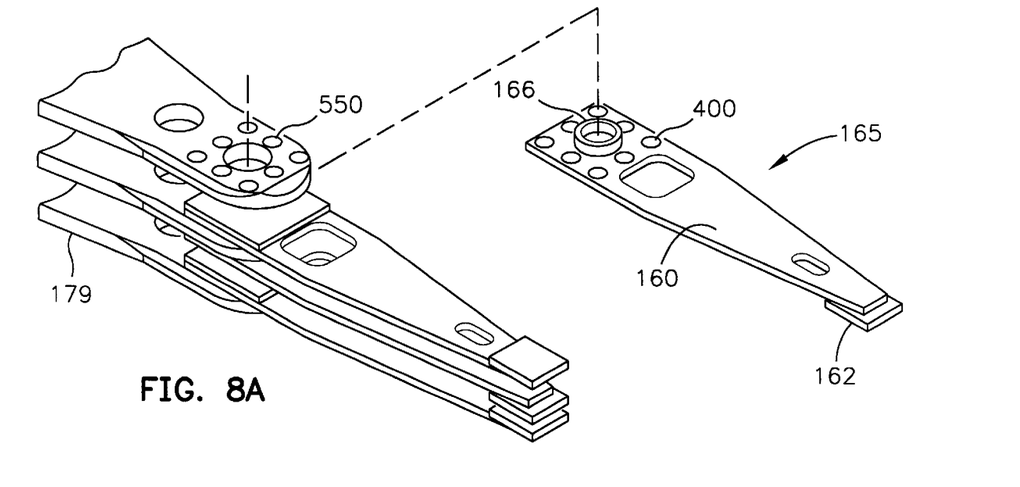
FIG. 8A is a partial perspective view of a portion of the head stack assembly shown in FIG. 1 which shows using liquid adhesive to attach a head gimbal assembly to an actuator arm.
Figure 8B:
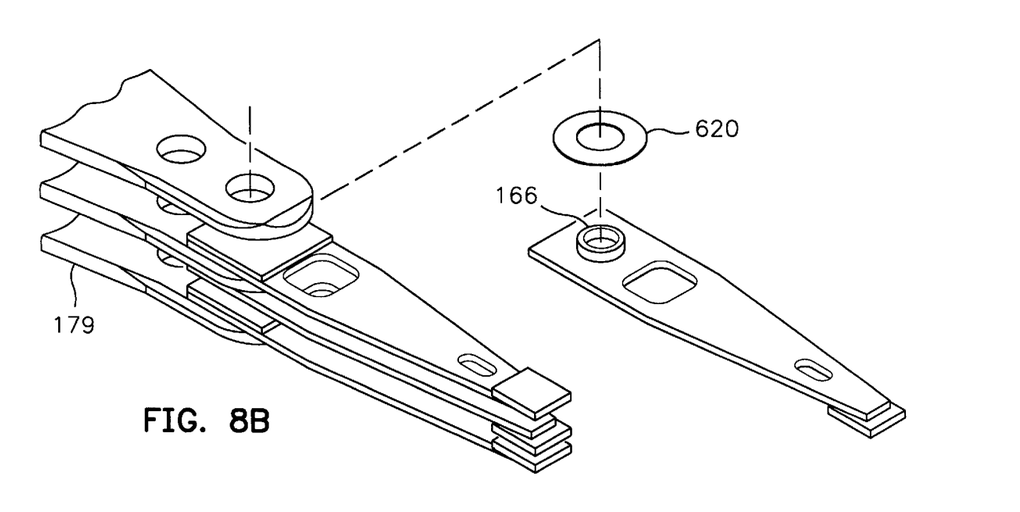
FIG. 8B is a partial perspective view of a portion of the head stack assembly shown in FIG. 1 which shows using an adhesive ring to attach a head gimbal assembly to an actuator arm.
Figure 8C:
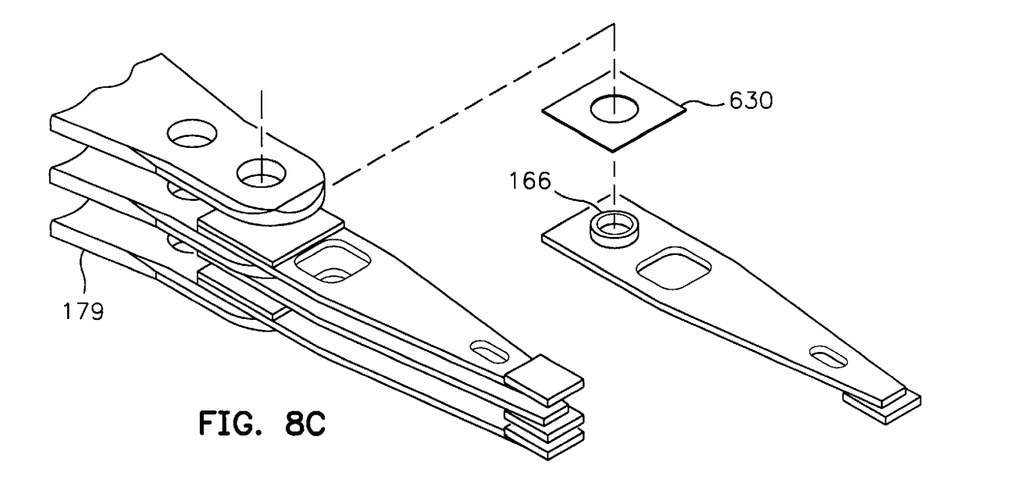
FIG. 8C is a partial perspective view of a portion of the head stack assembly shown in FIG. 1 which shows using another embodiment of an adhesive ring to attach a head gimbal assembly to an actuator arm.

With reference to FIGS. 8A–8C, alternative embodiments of attaching a head gimbal assembly to an arm are shown. These embodiments are alternatives to the swaging operation described above. In FIG. 8A, head gimbal assembly 165 includes load beam 160 and head 162. Load beam is suitably made from stainless steel and includes a cylindrical flange 166 and a liquid adhesive 400 applied to the load beam. Cylindrical flange 166 is used to locate the head gimbal assembly on the arm via a corresponding swage hole and for grounding the head gimbal assembly. Suitably, liquid adhesive 400 may include conductive epoxy, anaerobic adhesive, ultra-violet (UV) curable (cyanoacrylate) adhesive, or pressure sensitive adhesive. Different liquid adhesives may be applied in different locations on load beam 160 to achieve different results. For example, a conductive epoxy such as a long curing conductive epoxy may be applied in different locations on the load beam while a UV curable liquid adhesive may be applied in other locations. The long curing conductive epoxy would provide long term high strength and electrical conductivity for grounding, and the UV curable liquid adhesive would provide an instant cure to allow immediate handling of the head stack assembly. When using the UV curable liquid adhesive, corresponding through holes 550 in each arm 179 are preferably provided to allow UV light to pass through the arm to cure the adhesive.

In FIGS. 8B and 8C, a solid adhesive ring such as a circular ring 620 and a square ring 630 are used to attach a head gimbal assembly to each arm 179. The rings may embody shapes other than the ones shown such as any multi-faceted N-gon such as a hexagon and an octagon. Rings 620 and 630 may suitably include a pressure sensitive adhesive, a two part conductive epoxy, or a heat activated adhesive. Preferably, a ring is first attached to a load beam by positioning the ring around cylindrical flange 166 prior to attaching the load beam to the arm. Rings lacking any orientation requirement, such as circular ring 620, are preferred for their ease of assembly.

Figure 9:
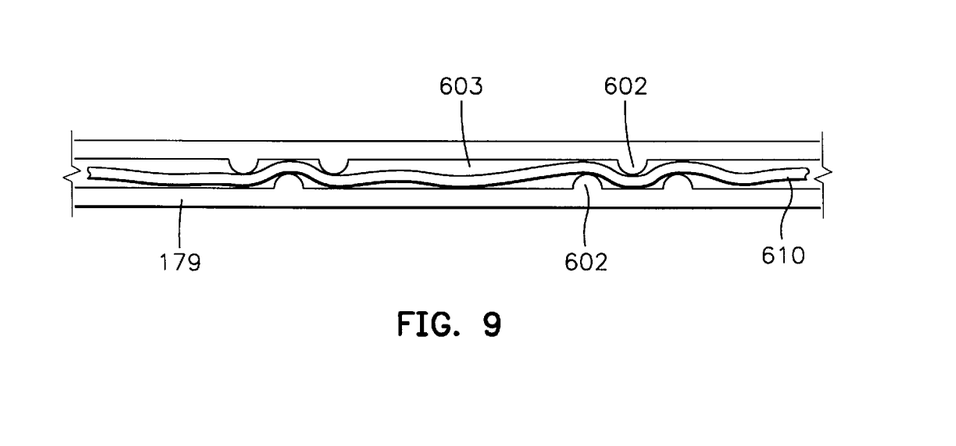
FIG. 9 is a partial side view of a portion of an actuator arm.

With reference to FIG. 9, each arm 179 includes an elongated slot 603 having a plurality of spaced-apart dimples 602. As shown, a tubing enclosing a plurality of wires 610 extends from a head on a head gimbal assembly to the mounting portion of a flex circuit cable. Suitably, two wires may be used for an inductive head or four wires may be used for an MR head. Slot 603 runs along a side of each arm, and dimples 602 secure the wires along the side of each arm. Preferably, slot 603 and dimples 602 are formed during the injection molding process of the plastic E-block.

Figure 11A:
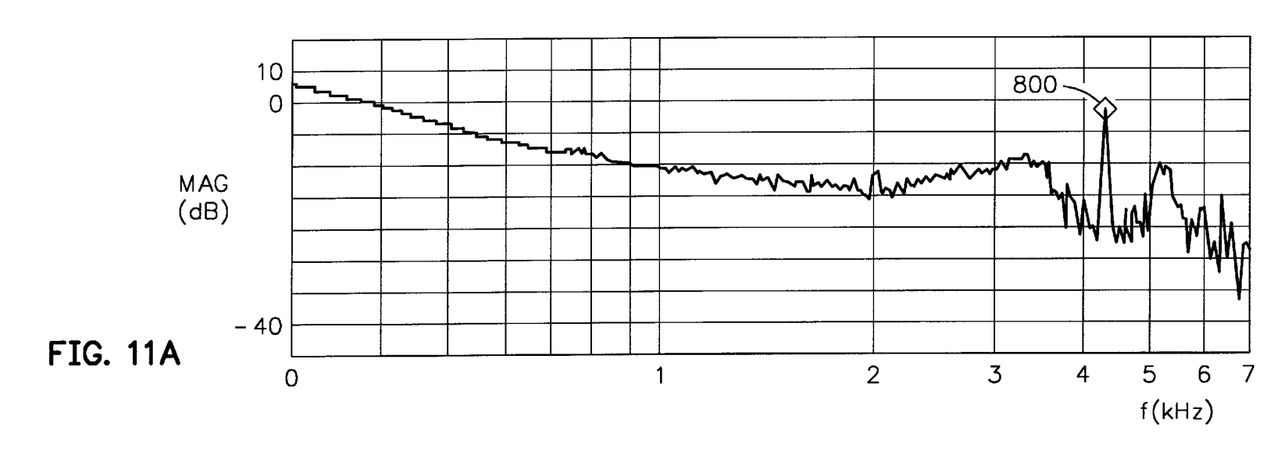
FIG. 11A is a graph of relative head displacement (Mag) as a function of frequency of a head stack assembly according to this invention which shows the effects of resonance at various resonant frequencies.
Figure 11B:
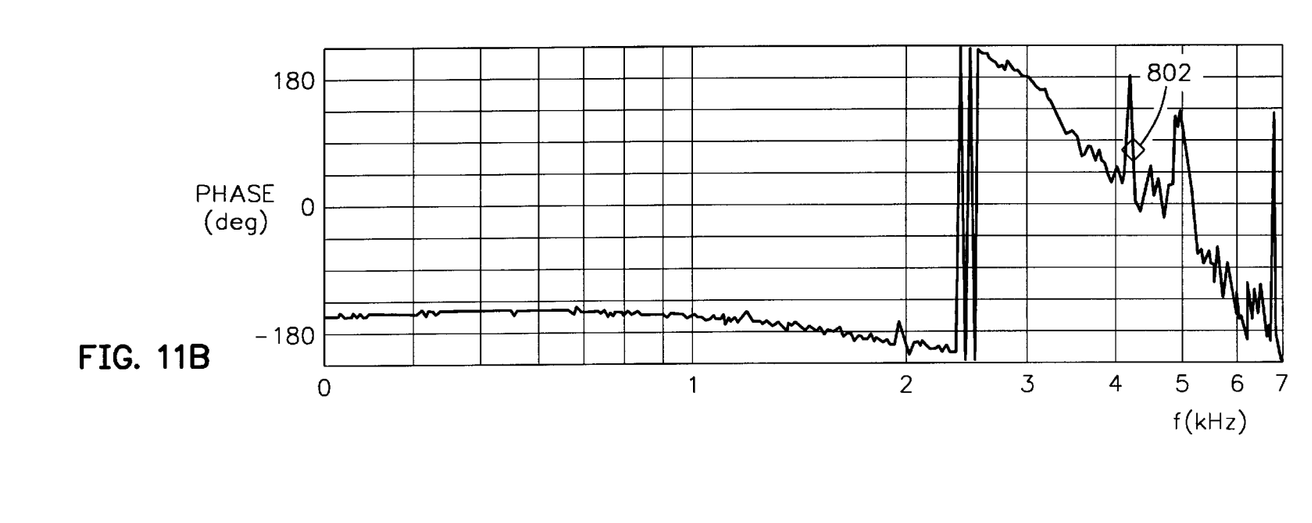
FIG. 11B is a graph of phase change as a function of frequency of the head stack assembly according to this invention which shows the effects of resonance at various resonant frequencies.

With reference to FIGS. 11A–11B, a head stack assembly having a plastic E-block of this invention exhibits a single narrow peak 800 with a corresponding phase change 802 at 4.33 kHz which is very close to the servo sampling rate of 4.3 kHz mentioned above relative to Prior Art FIGS.

10A–10B. Since peak 800 is very close to the servo sampling rate, the gain and phase margin of the servo system are not reduced which improves the operation of the servo system.

Significantly, a head stack assembly of this invention has lower mass and moment of inertia than the Prior Art head stack assembly which included an all metal E-block or stamped metal arms. Such a lower mass and moment of inertia decreases the access times for a given amount of power applied to a coil. In addition, the head stack assembly of this invention is cheaper than the Prior Art head stack assembly, and the location of the overmold interface resonant frequency can be more consistently controlled which improves the operation of the servo system.

We claim:

1. A head stack assembly for mounting to a pivot bearing cartridge in a disk drive, the head stack assembly comprising:

a coil having opposite electrical ends;

a unitary molded plastic E-block fabricated from a first thermoplastic material containing electrically conductive filler material such that the E-block is electrically conductive, the E-block defining:

a generally cylindrically shaped body portion and a plurality of elongated arms;

the body portion having a pivot bore for receiving the pivot bearing cartridge, a plurality of spaced-apart arm-support regions, and a surface defining a mounting site;

each of the arms being cantilevered from a respective one of the arm-support regions to project radially away from the pivot bore;

an overmolded coil frame;

a molecular bond region securing the coil to the body portion such that the coil is cantilevered to project radially away from the pivot bore, the molecular bond region and the overmolded coil frame being fabricated from the same thermoplastic material as the E-block and containing an electrically non-conductive filler;

a flex circuit cable having a portion secured at the mounting site, the flex circuit cable including a plurality of conductors;

means defining an electrical path from a first one of the conductors to provide ground potential to the E-block; and means defining a pair of electrical paths from a second and a third of the conductors to a respective one of the opposite electrical ends of the coil.

2. The head stack assembly of claim 1 wherein the first thermoplastic material is polyphenylene sulfide, polyphthalamide or liquid crystal polymer.

3. The head stack assembly of claim 2 wherein the conductive filler material is carbon.

4. The head stack assembly of claim 1 wherein the electrically non-conductive filler includes glass.

* * * * *